(12) United States Patent
Sun et al.

(10) Patent No.: US 9,176,003 B2
(45) Date of Patent: Nov. 3, 2015

(54) MACHINE VIBRATION MONITORING

(75) Inventors: Yanxia Sun, Oviedo, FL (US); Peter J. Clayton, Casselberry, FL (US); Albert C. Sismour, Jr., Casselberry, FL (US)

(73) Assignee: Siemens Energy, Inc., Orlando, FL (US)

(*) Notice: Subject to any disclaimer, the term of this patent is extended or adjusted under 35 U.S.C. 154(b) by 254 days.

(21) Appl. No.: 13/020,413

(22) Filed: Feb. 3, 2011

(65) Prior Publication Data

US 2011/0291850 A1   Dec. 1, 2011

Related U.S. Application Data

(60) Provisional application No. 61/347,990, filed on May 25, 2010.

(51) Int. Cl.
| | | |
|---|---|---|
| *G08B 21/00* | (2006.01) | |
| *G01H 1/00* | (2006.01) | |
| *G01M 13/02* | (2006.01) | |

(52) U.S. Cl.
CPC ............. *G01H 1/003* (2013.01); *G01M 13/028* (2013.01)

(58) Field of Classification Search
CPC . G01H 1/003; G01M 13/028; G01N 29/4454; G05B 2219/37435; G05B 23/0216; G05B 23/0272
USPC .............. 340/683, 679; 702/56, 80, 183, 187; 700/174
See application file for complete search history.

(56) References Cited

U.S. PATENT DOCUMENTS

| | | | |
|---|---|---|---|
| 4,633,418 A * | 12/1986 | Bishop ............................ | 702/63 |
| 5,210,704 A * | 5/1993 | Husseiny ........................ | 702/34 |
| 5,533,400 A | 7/1996 | Gasch et al. | |
| 5,544,073 A * | 8/1996 | Piety et al. .................... | 700/279 |
| 5,679,900 A * | 10/1997 | Smulders ........................ | 73/659 |
| 5,739,698 A * | 4/1998 | Bowers et al. ........... | 324/765.01 |
| 5,812,134 A * | 9/1998 | Pooser et al. ................. | 715/848 |
| 5,852,793 A | 12/1998 | Board et al. | |
| 6,729,186 B1 * | 5/2004 | Sirrine et al. ................... | 73/660 |
| 6,742,003 B2 * | 5/2004 | Heckerman et al. .......... | 398/189 |
| 6,801,864 B2 * | 10/2004 | Miller ............................. | 702/56 |
| 6,868,348 B1 * | 3/2005 | Stoutenburg et al. .......... | 702/56 |
| 6,904,371 B2 * | 6/2005 | Sonnichsen et al. ............ | 702/56 |

(Continued)

FOREIGN PATENT DOCUMENTS

| | | |
|---|---|---|
| DE | 19702234 A1 | 8/1998 |
| EP | 1081567 A2 | 3/2001 |

(Continued)

*Primary Examiner* — Ariel Balaoing
*Assistant Examiner* — Kam Ma

(57) ABSTRACT

A system and method of monitoring vibrations, in a machine having a rotating element, where composite vibration signals are measured and filtered into discreet vector components associated with machine operating frequency. The filtered vectors are then evaluated to obtain a mean and standard deviation, whereupon a further value is obtained and compared to the prior values. Trip conditions may be set to initiate certain actions based on the meeting of the conditions. Additional data related to operating conditions of the machine may be analyzed in conjunction with the vibration data to be considered as providing a cause for vibration anomalies that may be observed. The operating, conditions of the machine may be displayed on a computer display in association with the discreet vector components, for example in a second level folder to the first level folder of the discreet vector components.

19 Claims, 1 Drawing Sheet

(56) References Cited

U.S. PATENT DOCUMENTS

| | | | |
|---|---|---|---|
| 7,089,226 B1* | 8/2006 | Dumais et al. | 707/740 |
| 7,525,443 B2* | 4/2009 | Littrell | 340/679 |
| 7,623,694 B2* | 11/2009 | Raffy | 382/128 |
| 7,702,675 B1* | 4/2010 | Khosla et al. | 707/710 |
| 2002/0067358 A1* | 6/2002 | Casari et al. | 345/440 |
| 2004/0176926 A1* | 9/2004 | Edie et al. | 702/179 |
| 2005/0231350 A1* | 10/2005 | Littrell et al. | 340/511 |
| 2005/0246593 A1* | 11/2005 | Littrell | 714/48 |
| 2006/0089742 A1* | 4/2006 | Jalluri et al. | 700/159 |
| 2007/0126592 A1* | 6/2007 | Littrell | 340/679 |
| 2007/0198219 A1* | 8/2007 | Havela et al. | 702/187 |
| 2008/0065705 A1* | 3/2008 | Miller | 707/204 |
| 2008/0186194 A1* | 8/2008 | Kaminski et al. | 340/683 |
| 2010/0082164 A1* | 4/2010 | Lakomiak et al. | 700/280 |

FOREIGN PATENT DOCUMENTS

| | | |
|---|---|---|
| JP | S62151725 A | 7/1987 |
| JP | S63222229 A | 9/1988 |
| JP | H01140026 A | 6/1989 |
| JP | H01245122 A | 9/1989 |
| JP | H05079903 A | 3/1993 |
| JP | H07128134 A | 5/1995 |
| JP | H07286892 A | 10/1995 |
| JP | 8297049 S | 11/1996 |
| JP | H10020925 A | 1/1998 |
| JP | 2002041407 A | 2/2002 |
| JP | 2002358219 A | 12/2002 |
| JP | 2006341659 A | 12/2006 |
| JP | 2009257806 A | 11/2009 |

* cited by examiner

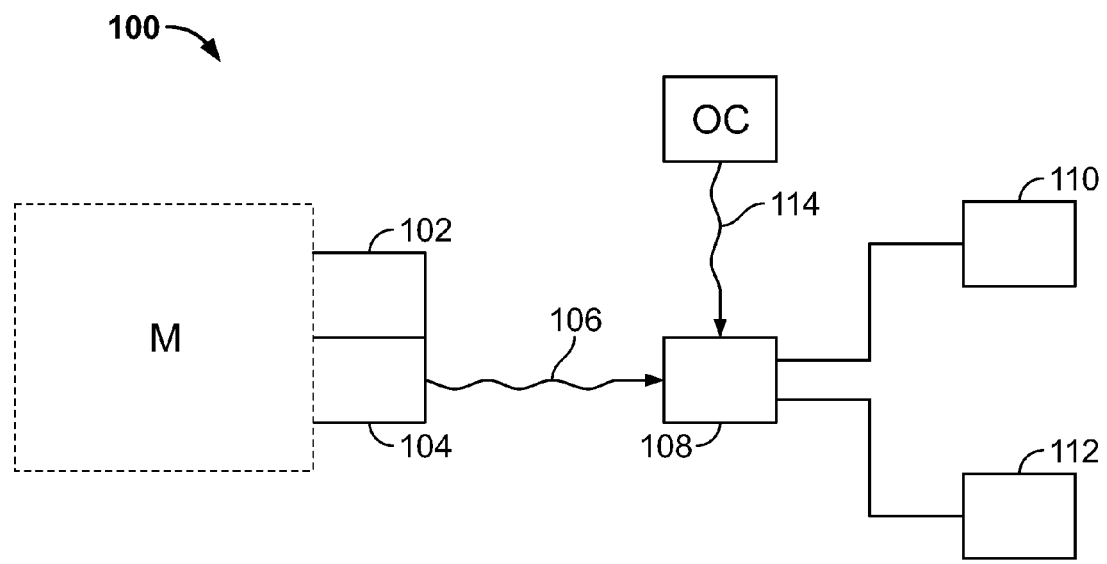

MACHINE VIBRATION MONITORING

CROSS REFERENCE TO RELATED APPLICATIONS

This application claims the benefit of the filing date of U.S. Provisional Patent Application No. 61/347,990 filed May 25, 2010, the disclosure of which is hereby incorporated herein by reference.

BACKGROUND OF THE INVENTION

The present invention relates to the monitoring of vibration signals from machines with rotating elements. It is well known that rotating elements within machinery may subject the machinery to vibrations at different vectors related to operating frequency, yet most vibration monitors collect data as a composite for all vectors. As such, a single composite vibration vector is measured even though it results from a composite of, for example, 1× operating frequency, 2× operating frequency, and 3× operating frequency vibration vectors. Conventionally, this composite frequency vector is analyzed as such by hand in analyzation methods that are painstakingly slow. While this technique has been useful, it limits the ability of machine users to analyze and predict the true effects of vibration signals in a more refined manner, for example as separate 1×, 2×, and 3× vectors, and therefore represents a limited approach to machine vibration analysis.

BRIEF SUMMARY OF THE INVENTION

It would be advantageous to enable a user to quickly and efficiently analyze vibration data which is filtered into its individual vectors. It would also be advantageous to then compare that filtered data real-time, or close thereto, with various operating conditions of the machine. Deviations from expected norms may then be identified and accounted for in heretofore unimaginable speed and precision.

To achieve these results, the present invention provides, in one embodiment, for a system for monitoring vibrations in a machine having a rotating element. In such embodiment, the system comprises a vibration measurement device, the vibration measurement device adapted to measure composite vibrations in the machine and output composite digital vibration signals corresponding to the composite vibrations measured, an operating condition sensor, the operating condition sensor measuring operating conditions of the machine, a processor, the processor adapted to receive and filter the composite digital vibration signals into first vibration vector signals and second vibration vector signals, the processor also adapted to receive the measured operating conditions, a storage unit, the storage unit storing the first vibration signals, the second vibration signals, and the operating conditions, and a display device, the display device displaying the first vibration signals in association with the operating conditions.

The display device may display the second vibration signals in association with the operating conditions.

A plurality of composite vibration measurements equaling N may be measured over time by the vibration measurement device, the N measurements being output as N composite digital vibration signals. The processor may thereby receive and filter the N measurements into N first vibration vector signals and N second vibration vector signals, the processor determining a mean value and standard deviation of the N first vibration vector signals. In such a system, the processor may receive and filter an N+1 composite vibration measurement measured at a later time into an N+1 first vibration vector signal and an N+1 second vibration vector signal. Upon the occurrence of the N+1 first vibration vector exceeding a first threshold value related to the mean value and standard deviation of the N first vibration vector signals, the processor may activate a first action. The first action may be an audible alarm. Upon the occurrence of the N+1 first vibration vector exceeding a second threshold value related to the mean value and standard deviation of the N first vibration vector signals, the processor may activate a second action, the second threshold value representing a greater deviation from the mean value than the first threshold value. The second action may be one of a machine operation change or machine shut down procedure. The N measurements may be measured at equal time increments.

The first threshold value may be related to the operating conditions, and the operating conditions may be one of a speed input, megawatt input, field current input, or clutch position input.

The first vibration vector signals and second vibration vector signals may be 1× and 2× signals, respectively.

In another embodiment of the present invention, a method of monitoring vibrations in a machine having a rotating element may be provided, where the method comprises measuring N composite vibrations in the machine over time, outputting N composite digital vibration signals corresponding to the N composite vibrations measured to a processor, receiving the N composite digital vibration signals corresponding to the N composite vibrations measured, filtering each of the N composite digital vibration signals into N first vibration vector signals and N second vibration vector signals, calculating a mean value and standard deviation of the N first vibration vector signals, measuring operating conditions of the machine, and displaying at least one of the N first vibration vector signals in association with at least one operating condition.

The N first vibration vector signals and N second vibration vector signals may be 1× and 2× vibration signals, respectively.

The step of displaying at least one of the N first vibration vector signals in association with at least one operating condition may display the N first vibration vector signals in a first level folder of a computer and the at least one operating condition in a second level folder of a computer.

The method may further comprise measuring an N+1 composite vibration in the machine, outputting an N+1 composite digital vibration signal corresponding to the N+1 composite vibration measured to a processor, receiving the N+1 composite digital vibration signal corresponding to the N+1 composite vibration measured, filtering the N+1 composite digital vibration signal into an N+1 first vibration vector signal and an N+1 second vibration vector signals, and comparing the N+1 first vibration vector signal to a first threshold value related to the mean value and standard deviation of the N first vibration vector signals. When the step of comparing the N+1 first vibration vector signal to a first threshold value exceeds the first threshold value, a first action may be commenced. The method may further comprise comparing the N+1 first vibration vector signal to a second threshold value related to the mean value and standard deviation of the N first vibration vector signals. When the step of comparing the N+1 first vibration vector signal to a second threshold value exceeds the second threshold value, a second action is commenced. The first action may be an audible alarm and the second action may be one of a machine operation change or machine shutdown.

BRIEF DESCRIPTION OF THE DRAWING

The above description, as well as further objects, features and advantages of the present invention will be more fully understood with reference to the following detailed description of the vibration monitoring system and methods when taken in conjunction with the accompanying drawing, wherein:

FIG. 1 depicts a schematic view of a vibration monitoring system.

DETAILED DESCRIPTION

In describing the preferred embodiments of the subject matter illustrated and to be described with respect to the drawing, specific terminology will be resorted to for the sake of clarity. However, the invention is not intended to be limited to the specific terms so selected, and it is to be understood that each specific term includes all technical equivalents which operate in a similar manner to accomplish a similar purpose.

Described herein are embodiments of the vibration monitoring system and method of the present invention. In general, the invention is designed to obtain lateral vibration signals measured by accelerometers or proximiters, or torsional vibration signals measured by magnetic pickups or optical sensors, from a machine with rotating elements or a single rotating element. These vibration signals represent a combination of vectors, for example those at 1×, 2×, and 3× operating speed. The signals may then be filtered to obtain the individual vibration vectors, for example individual vectors for the 1×, 2×, and 3× operating speeds. This filtering process may be conducted by a computer programmed in accordance with known methods such as Fourier transform analysis. The computer processor may then calculate the mean value and standard deviation value of the individual vibration vectors, against the backdrop of which warning and trip limits (first action and second action items) may be set based on historical machine vibration vector trending and, possibly, certain operating conditions of the machine.

These warning and trip limits are preferably designed to prevent catastrophic failure of the machine by warning an operator of possible issues with the machine or possibly by automatically shutting down the machine. The warning limits and trip limits are not fixed values and may be calculated or determined based on historical trending, being updated automatically as additional vibration readings are taken over time.

In this regard, the present invention provides for condition-based protection for machines with rotating elements, protecting against structural failures that may result from rotor cracks, loose parts, broken parts, etc.

It is known that structural changes or failures of such machines change the vibration vector. Thus, when a vibration vector changes, the amplitude of the vibration may increase, stay unchanged, or decrease. Traditional vibration monitoring uses the amplitude of unfiltered signals to setup the alarm/trip conditions for increasing amplitude conditions only, and also only uses predetermined fixed values for the alarm/trip conditions. Because of this, the traditional methods can only account for increases in vibration amplitude, missing those situations where damage/failures result in unchanged or even decreasing amplitude. In addition, prior methods only set alarm/trip conditions at one vibration reading, and cannot evaluate changes in trending up to those readings.

Depicted as FIG. 1 is a schematic representation of a system 100 for monitoring vibration characteristics of a machine (M) with rotating elements. As shown, attached to the machine (M) is a conventional lateral vibration measurement device 102, such as an accelerometer or proximiter (it will be appreciated that remaining portions of this disclosure generally refer to lateral vibration signals for convenience, but it is to be understand that lateral, torsional, or other vibrations are included in the scope of the invention). This device may be a part of the machine (M) or added as part of the inventive system. The lateral vibration measurement device 102 measures composite vibrations at predetermined time intervals. As such, a total of N readings may be taken over time. Solely as an example, readings may be taken every hour for 24 hours, producing N=24 discreet composite vibration readings. As another example, readings may be taken once per day for a year, for a total of N=365 discreet composite vibration readings.

Associated with the lateral vibration measurement device 102 is an analog to digital converter 104 to convert the readings from analog signals to digital signals. This unit may also be a part of the machine (M) or part of the inventive system. Those signals are then sent as composite digital vibration signals 106 from the converter 104 to a computer processor 108 in any number of manners, including direct cabling or wireless technologies. The signals may be sent locally or over the internet as well.

The computer processor 108 accepts the signals 106 and applies a Fourier transform to convert the composite digital vibration signals 106 into separate vibration vectors of amplitude and phase related to the operating frequency of the machine (M). These separate vibration vectors may relate to the 1×, 2×, or 3× operating frequencies, but may also be associated with intermediate increments, such as 1.5×. The processor 108 then calculates a mean value and standard deviation for each separate vector. For ease of discussion, an assumed 1× vector will be considered.

For this 1× vector, the processor 108 will have determined amplitudes for N readings, N being equal to the number of readings taken. For these N readings, the processor will then calculate a mean value and standard deviation.

The next reading, reading number N+1, will then be sent to the processor by the lateral vibration measurement device 102 and subsequent analog to digital converter 104. When the processor receives this signal and filters out the individual 1× vector, that reading is compared to the previous readings. If the value exceeds a first preset value based on the standard deviation, a first action may be taken by the processor 108. Examples of first actions are audible alarms or visual indications, the visual indications being displayed on a display device 110 associated with the processor 108. Similarly, if the value exceeds a second preset value based on the standard deviation, a second action may be taken by the processor 108. Examples of second actions may include machine operation change right up to full stoppage of the machine. The preset values may be adjusted over time by the operator as trending analysis of the readings is undertaken.

It will be appreciated that current vibration monitoring systems are generally only tripped, where the processor takes an action, when a preset vibration limit is measured. These limits are generally associated with industry norms and machine design guidelines, and are often associated with limits approaching catastrophic machine failure. With the inventive system, an operator can observe trending as, for example, that upper limit is approached. If the trending is consistent over time, the operator can evaluate the reasoning for such trending and may not take any action independent of the actions that may be taken by the processor. However, the operator may take action as well. This level of analysis was not previously possible.

Additionally, even where trending is considered, there may be a swift change in the readings which is outside the trend, yet still below the level that would trip a prior art system. In this case, given the increased data available under the current system, the operator can evaluate the machine (M) to determine if action needs to be taken, even before the vibrations approach a level that would require the processor 108 to trip the machine (M).

To evaluate the trending over time, and to enable an operator to review past vibration values, the processor 108 may be associated with a storage unit 112, such as a hard drive or other memory device, that stores the vibration values obtained by the processor.

In addition to the vibration signals evaluated by the processor 108, the system may also include one or more operating condition sensors (OC). These sensors may sense and report to the processor 108 conditions in and around the machine (M), such as temperature conditions, speed of machine components, megawattage produced by the machine or used by the machine, field current through a generator, clutch position of various components of the machine, among others. This data 114 may also be stored in the storage unit 112 and displayed by the display device 110 automatically with each N vibration reading or as prompted by the operator. In this manner, vibration trending can easily be compared to other operating conditions to assist with determining the cause of any change in vibration trending.

For example, it may be noticed over time that vibration at 1× of a particular machine (M) often increases by just over one standard deviation when the external temperature increases beyond a certain temperature reading. In such case, upon the occurrence of a this standard deviation increase in 1× vibration at the particular facility, an operator can readily obtain the temperature data to determine if an increase in temperature is causing the vibration increase. If it is not, the operator can then run through other condition parameter information to identify other possible correlations, or to identify whether there is an impending failure condition of the machine (M).

Software associated with the processor 108 and display device 110 may be provided-to visually, on the display device, show different "folders" associated with different inputs and operating conditions for easy evaluation. For example, a folder of vibration readings at full operating speed of the machine may be created. A "sub-folder" for each operating condition may then be programmed to appear within the general folder. In this regard, using temperature as an example, a "sub-folder" for a first temperature and a "sub-folder" for a second temperature may be created.

As the machine runs and the vibration signals are collected, the data populates the folders for later evaluation. Again using temperature as an example, there may be a folder created for full operation speed. Under that "folder," there may be a "sub-folder" for operation at 70° F. and a second "sub-folder" for operation at 80° F. When the machine (M) is operated at full speed and the temperature is 70° F., data will populate the 70° F. "sub-folder" under the "full speed" folder. On the other hand, when the temperature rises to 80° F., data will populate the 80° F. "sub-folder" under the "full speed" folder. An operator may thereafter easily view data associated with certain operating conditions as necessary. Of course, additional "sub-folders" under the main "folder" may be created for other operating conditions. Likewise, if programmed as such, third level "sub-folders" may be created for other operating conditions. As an example, a third level "sub-folder" may be created for full speed operation (level one), at 70° F. (level two), with a particular clutch position of a given component (level three). Of course, other examples may be provided.

Although many methods may be provided for collecting and evaluating vibration data, the following may be used as an example. In this method, N composite lateral vibration levels in the machine may be measured over time. Again, the time period may vary, but typical examples may be once per hour or once per day. As the number of measurements N increases, it will be appreciated that the resulting analysis precision also increases.

Those measured N composite lateral vibration levels may then be output as digital signals (or otherwise and then converted) where they are received by a processor. The processor may then filter each of the N composite signals into at least N first vibration vector signals and N second vibration vector signals. Filtering may be achieved using Fourier transform analysis. Of course additional vibration vector signals can also be filtered out for increased precision. As an example, the vectors that may be filtered may be the 1× and 2× operating speed vectors.

Once filtering is completed, the N filtered vectors are analyzed for a mean and standard deviation. This may include all of the sets of N filtered vectors or just individual sets. Having then established that baseline, albeit a moving baseline based on the number N of measurements taken, an N+1 measurement may be taken, filtered, and then compared to the mean and standard deviation. If a first threshold, or value outside of a predetermined value based on the mean and standard deviation, is exceeded, then the processor may take a first action. Such actions may include an audible alarm or visual alarm, among other actions. Likewise, if a second threshold is exceeded, a second action may be undertaken. This action generally accounts for a larger discrepancy from the standard deviation and therefore usually consists of more definitive actions, such as machine operation changes or shut downs.

Through all of these occurrences, the N vibration values may be stored on a storage unit and reviewed on a display device. They may also be compared to other operating conditions of the machine, taken at the same time as each of the N readings, as discussed above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for monitoring vibrations in a machine having a rotating element, the system comprising:
   a storage unit;
   a vibration measurement device, the vibration measurement device adapted to measure composite vibrations in the machine and output composite digital vibration signals, each such composite digital vibration signal corresponding to the measured composite vibrations;
   an operating condition sensor, the operating condition sensor measuring a plurality of operating conditions of the machine, the plurality of operating conditions including a first operating condition and a second operating condition, the second operating condition being distinct from the first operating condition;
   a processor, the processor adapted to:
   (i) receive and filter a vibration vector signal from the composite digital vibration signal at a measurement time,
   (ii) select a primary operating condition state of the first operating condition based on the measured plurality of operating conditions of the machine at the measurement time for the composite vibration signal,
   (iii) select a secondary operating condition state of the second operating condition based on the measured plurality of operating conditions of the machine at the measurement time for the composite vibration signal, (iv) store the vibration vector signal in association with the selected primary operating condition state and the selected secondary operating condition state, (v) store the selected secondary operating condition state in association with the selected primary operating condition state, vi) perform procedures (i)-(v) for a plurality of subsequent measurement times, (vii) associate, by value, the plurality of selected primary operating condition states with at least one primary category, (viii) relate each of the selected secondary operating condition states to the associated primary operating condition states of the at least one primary category, wherein a plurality of composite vibration measurements equaling N are measured over time by the vibration measurement device, the N measurements being output as N composite digital vibration signals; the processor thereby receiving and filtering said N measurements into N first vibration vector signals and N second vibration vector signals, the processor determining a mean value and standard deviation of said N first vibration vector signals, wherein the processor receives and filters an $N+1^{th}$ composite vibration measurement that is measured at a later time into an $N+1^{th}$ first vibration vector signal and an $N+1^{th}$ second vibration vector signal, whereby upon the occurrence of said $N+1^{th}$ first vibration vector exceeding a first threshold value related to said mean value and standard deviation of said N first vibration vector signals, said processor activates a first action, wherein said first threshold value is a warning limit and said first action is an audible alarm, such that the warning limit is determined based on at least historical trending data and the warning is automatically updated over a period of time based on additional data; and a display device, the display device being operative to selectively display each vibration vector signal, in order to show the selected primary operating condition state and the selected secondary operating condition state from a same measurement time associated with the at least one respective primary category when each vibration vector signal is selected for viewing.

2. The system of claim 1, whereby upon the occurrence of said $N+1^{th}$ first vibration vector exceeding a second threshold value related to said mean value and standard deviation of said N first vibration vector signals, said processor activates a second action, said second threshold value representing a greater deviation from said mean value than said first threshold value.

3. The system of claim 2, wherein said section action is one of a machine operation change or machine shut down procedure.

4. The system of claim 1, wherein said first threshold value is related to said operating conditions.

5. The system of claim 4, wherein said operating conditions are one of a speed input, megawatt input, field current input, or clutch position input.

6. The system of claim 1, wherein said first vibration vector signals and second vibration vector signals are a first signal at a first frequency and a second signal at a second frequency, respectively.

7. The system of claim 1, wherein said N measurements are measured at equal time increments.

8. The system of claim 1, wherein the primary operating condition state is selected from a group consisting of: a threshold value associated with the first operating condition and a range associated with the first operating condition.

9. The system of claim 1, wherein the first operating condition is selected from a group consisting of: temperature, speed of at least one component of the machine, megawattage used by the machine, megawattage produced by the machine, field current through a generator, and clutch position of the machine.

10. The system of claim 1, wherein the secondary operating condition state is selected from a group consisting of: a threshold value associated with the second operating condition and a range associated with the second operating condition.

11. The system of claim 1, wherein the second operating condition is selected from a group consisting of: temperature, speed of at least one component of the machine, megawattage used by the machine, megawattage produced by the machine, field current through a generator, and clutch position of the machine.

12. The system of claim 1, further comprising an analog-to-digital converter (ADC) configured to convert a plurality of analog vibration signals to a plurality of digital vibration signals, wherein the system is configured to send the composite digital vibration signals from the ADC to the processor via a wired connection or a wireless connection.

13. A method of monitoring vibrations in a machine having a rotating element, the method comprising:
  (i) measuring N composite vibrations in the machine over time;
  (ii) outputting N composite digital vibration signals, each such composite digital vibration signal corresponding to the N composite vibrations measured at a measurement time to a processor;
  (iii) receiving the N composite digital vibration signals corresponding to the N composite vibrations measured;
  (iv) filtering each of the N composite digital Vibration signals into N first vibration vector signals;
  (v) calculating a mean value and standard deviation of the N first vibration vector signals;
  (vi) measuring a plurality of operating conditions of the machine, the plurality of operating conditions including a first operating condition and a second operating condition, the second operating condition being distinct from the first operating condition;
  (vii) selecting a primary operating condition state of the first operating condition based on the measured plurality of operating conditions of the machine at the measurement time for the composite vibration signal;
  (viii) selecting a secondary operating condition state of the second operating condition based on the measured plurality of operating conditions of the machine at the measurement time for the composite vibration signal;
  (ix) storing the first vibration vector signal in association with the selected primary operating condition state and the selected secondary operating condition state;
  (x) storing the secondary operating condition state in association with the primary operating condition state;
  (xi) performing procedures (vi)-(x) for a plurality of subsequent measurement times;
  (xii) associating, by value, the plurality of primary operating condition states with at least one primary category;
  (xiii) relating each of the secondary operating condition states to the associated primary operating condition states of the at least one primary category;

filtering each of the N composite digital vibration signals into N first vibration vector signals and N second vibration vector signals;

measuring an N+1$^{th}$ composite vibration in the machine; outputting an N+1$^{th}$ composite digital vibration signal corresponding to the N+1$^{th}$ composite vibration measured to a processor;

receiving the N+1$^{th}$ composite digital vibration signal corresponding to the N+1$^{th}$ composite vibration measured;

filtering the N+1$^{th}$ composite digital vibration signal into an N+1$^{th}$ first vibration vector signal and an N+1$^{th}$ second vibration vector signals; and comparing the N+1$^{th}$ first vibration vector signal to a first threshold value related to the mean value and standard deviation of the N first vibration vector signals;

when said step of comparing the N+1$^{th}$ first vibration vector signal to a first threshold value exceeds the first threshold value, a first action is commenced, wherein said first threshold is a warning limit and said first action is an audible alarm, such that the warning limit is determined based on at least historical trending data and the warning limit is automatically updated over a period of time based on additional data;

(xiv) displaying, selectively, at least one of the N first vibration vector signals in order to show the primary operating condition state and the secondary operation condition state from a same measurement time associated with the at least one respective primary category when the at least one of the N first vibration vector signal is selected for viewing; and an analog-to-digital converter (ADC) configured to convert a plurality of analog vibration signals to a plurality of digital vibration signals, wherein the system is configured to send the composite digital vibration signals from the ADC to the processor via a wired connection or a wireless connection.

14. The method of claim 13, further comprising comparing the N+1$^{th}$ first vibration vector signal to a second threshold value related to the mean value and standard deviation of the N first vibration vector signals.

15. The method of claim 14, wherein when said step of comparing the N+1 first vibration vector signal to a second threshold value exceeds the second threshold value, a second action is commenced.

16. The method of claim 15, wherein the second action is one of a machine operation change or machine shutdown.

17. The method of claim 13, further comprising filtering each of the N composite digital vibration signals into N first vibration vector signals and N second vibration vector signals.

18. The method of claim 17, wherein the N first vibration vector signals and N second vibration vector signals are a first signal at a first frequency and a second signal at a second frequency, respectively.

19. A system for monitoring vibrations in a machine having a rotating element, said system comprising:
   a storage unit for storing vibration signal values and operating condition values from the machine;
   a vibration measurement device, said vibration measurement device adapted to measure composite vibrations in the machine and output composite digital vibration signals, each such composite digital vibration signal corresponding to the measured composite vibrations;
   at least one operating condition sensor, said at least one operating condition sensor measuring a plurality of operating conditions of the machine, the plurality of operating conditions including a first operating condition and a second operating condition, wherein the first operating condition and the second operating condition are different operating conditions of the machine;
   a processor that is programmed to:
      (i) receive N composite digital vibration signals from the vibration measurement device;
      (ii) filter the N composite digital vibration signals into N first and second vibration vector signals;
      (iii) receive operating condition signals from the at least one operating condition sensor;
      (iv) select a primary operating condition state for the first operating condition at the measuring time for each of the N composite digital signals;
      (v) select a secondary operating condition state for the second operating condition at the measuring time for each of the N composite digital signals;
      (vi) calculate a mean value and a standard deviation for the N first and second vibration vectors respectively;
      (vii) filter an N+1$^{th}$ composite digital vibration signal into an N+1$^{th}$ first and second vibration vectors that are related to a next operating frequency of the machine; and
      (viii) compare the N+1$^{th}$ composite digital vibration signal to a first preset limit, wherein the processor activates a first action if the first preset limit is exceeded, said first action being an audible alarm, and further wherein the first preset limit is related to said mean value and standard deviation of the N first vibration vectors and updated over a period of time based on additional composite digital vibration signals.

* * * * *